US011002228B1

(12) United States Patent
Pohlkamp et al.

(10) Patent No.: US 11,002,228 B1
(45) Date of Patent: May 11, 2021

(54) SYSTEMS AND METHODS FOR FUEL COOLING

(71) Applicant: Ford Global Technologies, LLC, Dearborn, MI (US)

(72) Inventors: Kyle Pohlkamp, Waunakee, WI (US); Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/712,387

(22) Filed: Dec. 12, 2019

(51) Int. Cl.
  *F02M 31/20* (2006.01)
  *F02M 53/04* (2006.01)

(52) U.S. Cl.
  CPC ........ *F02M 31/205* (2013.01); *F02M 53/043* (2013.01)

(58) Field of Classification Search
  CPC ..... F02M 31/205; F02M 53/043; F02M 31/20
  See application file for complete search history.

(56) References Cited

U.S. PATENT DOCUMENTS

| 8,006,675 | B2 | 8/2011 | Chyo et al. | |
|---|---|---|---|---|
| 9,493,051 | B2 | 11/2016 | Bills et al. | |
| 2013/0174815 | A1 | 7/2013 | Cleary | |
| 2016/0068037 | A1* | 3/2016 | Burke | F01P 3/20 62/243 |
| 2016/0123276 | A1* | 5/2016 | Tsujino | F02M 21/0245 137/565.16 |
| 2018/0073473 | A1* | 3/2018 | Snead | F02M 31/20 |
| 2018/0229581 | A1* | 8/2018 | Burke | B60H 1/00271 |
| 2018/0328307 | A1 | 11/2018 | Kurtz et al. | |

* cited by examiner

*Primary Examiner* — Jacob M Amick
(74) *Attorney, Agent, or Firm* — Geoffrey Brumbaugh; McCoy Russell LLP

(57) ABSTRACT

Methods and systems are provided for cooling fuel in an engine. In one example, a fuel temperature is reduced by transferring heat from the fuel to a cooling fluid. The heat exchange may occur in an unpressurized region of a fuel system.

16 Claims, 7 Drawing Sheets

SYSTEMS AND METHODS FOR FUEL COOLING

FIELD

The present description relates generally to methods and systems for reducing fuel temperature in an engine.

BACKGROUND/SUMMARY

Torque may be provided by fuel combustion at cylinders of a vehicle's engine. An amount of torque produced by combustion may depend on a combination of valve timing, spark timing and fuel injection, and energy provided by combustion of fuel is affected by injection timing as well as injector pulse width. The pulse width determines an amount of fuel injected at the cylinders and may be adjusted based on a number of factors affecting engine performance, such as oxygen levels, coolant temperatures, etc. However, regulation of the amount of injected fuel may not accommodate changes to fuel density arising from heating of the fuel. At elevated fuel temperatures, e.g., higher than fuel temperatures optimized to provide desired torque upon combustion, a density of the fuel may decrease and cause a lower than expected amount of fuel to be delivered at the fuel injectors. In some instances, the amount of fuel needed to meet a torque demand to compensate for reduced density may exceed a maximum deliverable quantity of the fuel injectors. This may adversely affect power output of the engine.

Attempts to address high fuel temperatures at the engine cylinders include equipping a vehicle with one or more fuel cooling devices. One example approach is shown by Chyo et al. in U.S. Pat. No. 8,006,675. Therein, a fuel for a diesel engine system with a rail fuel injection system may be cooled by a coolant pump and a fan. Fuel returned from the engine may pass through a fuel-to-coolant heat exchange system to transfer heat from the fuel to the coolant. An air-to-coolant heat exchange system may be coupled to the fuel-to-coolant heat exchange system to transfer heat from the coolant to air flowing across an air-to-coolant heat exchanger. Thus coolant cooled by heat exchange with air may then absorb heat from fuel at a fuel-to-coolant heat exchanger of the fuel-to-coolant heat exchange system. An amount of cooling imparted to the fuel may be adjusted by the coolant pump and/or the fan.

However, the inventors herein have recognized potential issues with such systems. As one example, cooling of the fuel relies on ambient air having a temperature lower than that of the heated coolant. A lowest temperature that the coolant may be cooled to is equal to the temperature of ambient air and thus a lowest temperature that the fuel may be cooled to is also equal to the temperature of ambient air. In some instances, such as in hot climates, ambient air temperatures may be similar to an upper threshold of desirable fuel temperature. Above the upper threshold temperature, fuel density may be decreased to an extent that torque output of the engine may be degraded. In such examples, cooling by ambient air may not sufficiently reduce fuel temperature.

In one example, the issues described above may be addressed by a method for a vehicle including flowing a fuel from a high pressure pump to a fuel injector, injecting the fuel at a cylinder, and cooling the fuel to a temperature that is below ambient temperature via a compressed cooling fluid at a region of a fuel system of the vehicle. In this way, fuel temperature may be decreased below ambient air temperature prior to injection at combustion chambers of the engine.

As one example, a fuel system and a heating, ventilation, and air conditioning (HVAC) system of a vehicle may share a heat exchanger that enables transfer of heat from the fuel system to the HVAC system. Fuel in the fuel system may be cooled directly or indirectly by refrigerant in the HVAC system, allowing fuel temperature to be reduced to a temperature provided by refrigerant chilled via circulation through the HVAC system. In this way, fuel temperature may be lowered to a desirable temperature regardless of ambient air temperature and engine performance may be maintained high.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
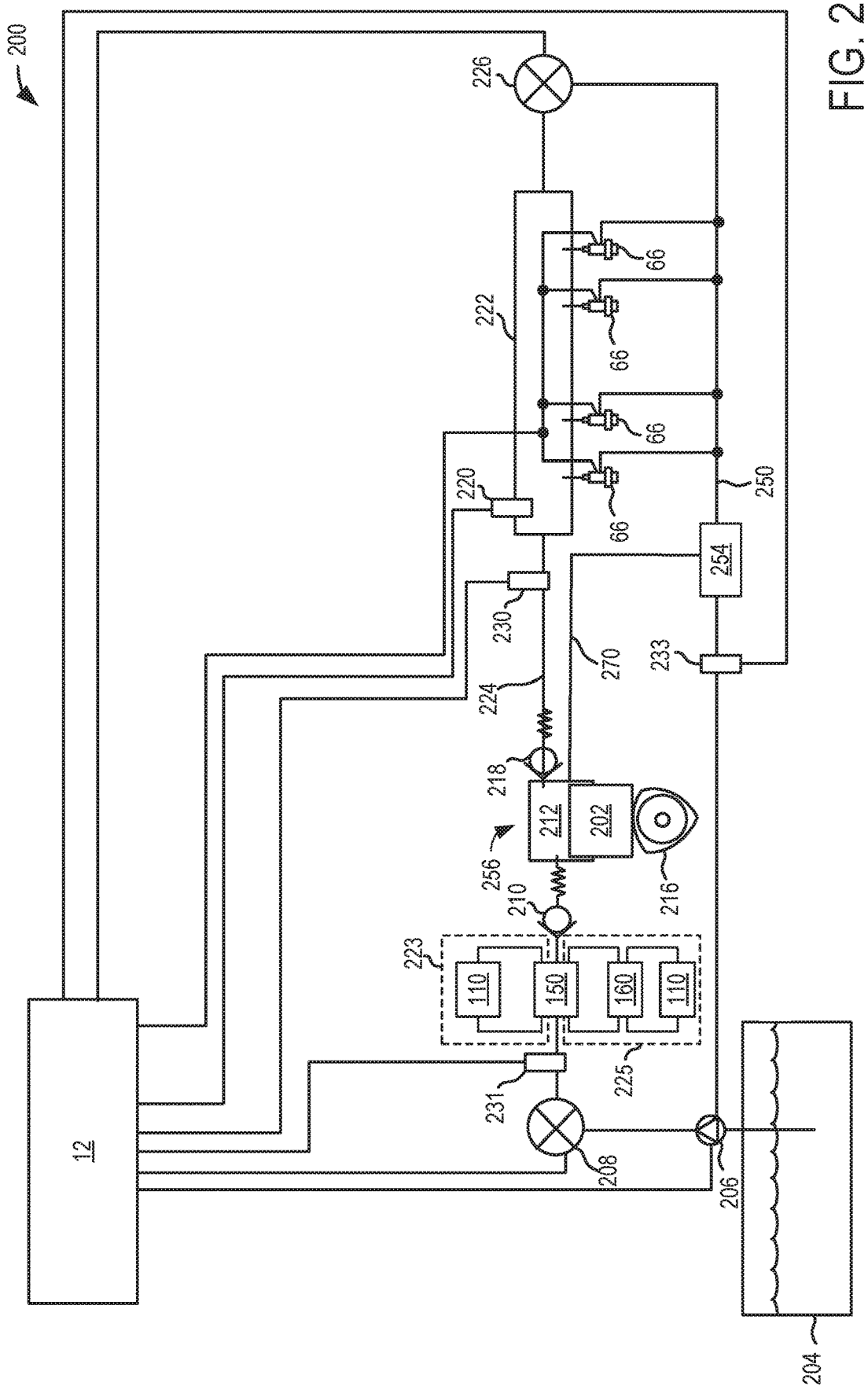
FIG. 2 shows a schematic diagram of a fuel system of a vehicle which may exchange heat with any of examples of the HVAC system of FIGS. 1A-1D through a heat exchanger.
Figure 3:
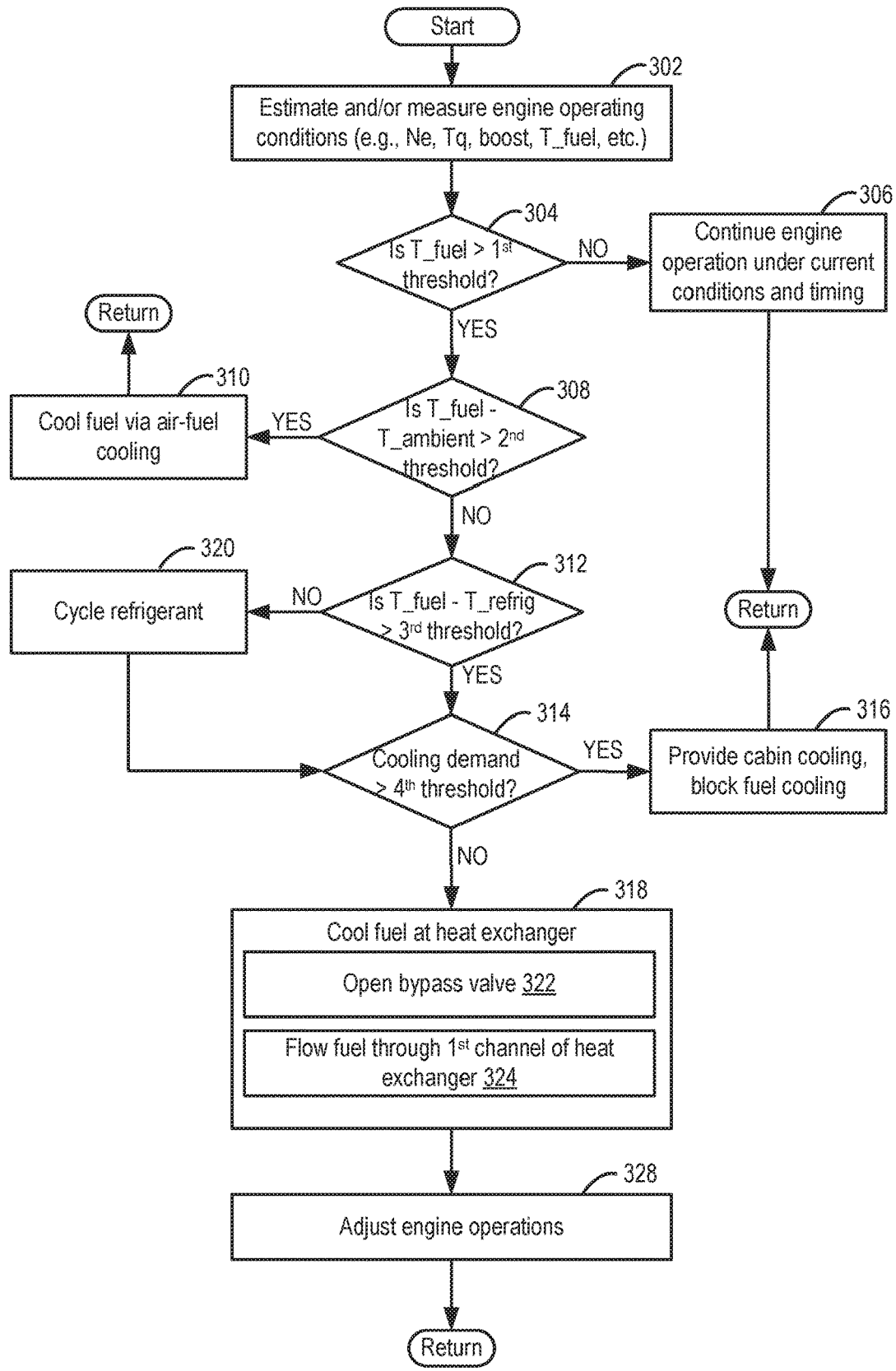
FIG. 3 shows a method for cooling fuel below ambient temperature.

The following description relates to systems and methods for cooling fuel prior to injection. A fuel system may provide fuel to a vehicle engine to power propulsion of the vehicle when the fuel is combusted at the vehicle's combustion chambers. An example of a vehicle configured with an HVAC system to allow cooling of a passenger compartment is shown in FIGS. 1A-1D. Each of FIGS. 1A-1D depicts a different arrangement of a heat exchanger coupled to the HVAC system, the heat exchanger configured to cool fuel below an ambient temperature, e.g., a low temperature (LT) heat exchanger. Engine operations and activation of devices in the fuel system may lead to an increase in fuel temperature, increasing a likelihood of reduced torque due to insufficient quantities of injected fuel to match target air-to-fuel ratios at the combustion chambers. By passing the fuel through the LT heat exchanger coupled to the HVAC system of the vehicle, the fuel may be cooled via heat transfer to a refrigerant of the HVAC system. An example of a vehicle fuel system coupled to the HVAC system via the LT heat exchanger is shown in FIG. 2. An example of a method for transferring heat from the fuel system to the HVAC system to reduce a temperature of the fuel is depicted in FIG. 3. Example operations responsive to heat exchange between the fuel system and the HVAC system in the vehicle are shown in an operational map illustrated in FIG. 4.

FIGS. 1A-1D depict a schematic depiction of an example embodiment of a vehicle cooling system 100 in a motor vehicle 102. Vehicle 102 has wheels 106, a passenger compartment 104, and an under-hood compartment 103. Under-hood compartment 103 may house various under-hood components under the hood (not shown) of motor vehicle 102. For example, under-hood compartment 103 may house an internal combustion engine 10. Internal combustion engine 10 has a combustion chamber that may receive intake air via an intake passage 44 and may exhaust combustion gases via an exhaust passage 48. In one example, intake passage 44 may be configured as a ram-air intake, wherein the dynamic pressure created by moving vehicle 102 may be used to increase a static air pressure inside the engine's intake manifold. As such, this may allow a greater mass flow of air through the engine, thereby increasing engine power. Vehicle 102 as illustrated and described herein may be a road automobile, among other types of vehicles. While the example applications of engine 10 will be described with reference to vehicle 102, it should be appreciated that various types of engines and vehicle propulsion systems may be used, including passenger cars, trucks, etc.

In some examples, vehicle 102 may be a hybrid electric vehicle (HEV) with multiple sources of torque available to one or more of wheels 106. In other examples, vehicle 102 is a conventional vehicle with only an engine or an electric vehicle with only an electric machine(s). In the example shown, vehicle 102 includes engine 10 and an electric machine 52. Electric machine 52 may be a motor or a motor/generator. A crankshaft (not shown) of engine 10 and electric machine 52 are connected via transmission 54 to vehicle wheels 106 when one or more clutches 56 are engaged. In the depicted example, a first clutch 56 is provided between engine 10 (e.g., between the crankshaft of engine 10) and electric machine 52, and a second clutch 56 is provided between electric machine 52 and transmission 54. A controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners, including as a parallel, a series, or a series-parallel hybrid vehicle. In electric vehicle embodiments, a system battery 58 may be a traction battery that delivers electrical power to electric machine 52 to provide torque to vehicle wheels 106. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator 72.

Alternator 72 may be configured to charge system battery 58 using engine torque via the crankshaft while the engine 10 is running. In addition, alternator 72 may power one or more electrical systems of the engine, such as one or more auxiliary systems including a heating, ventilation, and air conditioning (HVAC) system 110, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 72 in order to regulate the power output of the alternator based upon system usage requirements, including auxiliary system demands.

Under-hood compartment 103 may further include an engine cooling system 100, which includes a radiator 80, as well as the heating, ventilation and air conditioning (HVAC) system 110, which includes a condenser 88. The cooling system 100 circulates coolant through internal combustion engine 10 to absorb waste heat and distributes the heated coolant to the radiator 80 and/or a heater core 55 via coolant lines 82 and 84, respectively. In one example, as depicted, cooling system 100 may be coupled to engine 10 and may circulate engine coolant from engine 10 to radiator 80 via an engine-driven water pump 86 and back to engine 10 via coolant line 82. Engine-driven water pump 86 may be coupled to the engine via a front end accessory drive (FEAD) 36 and rotated proportionally to engine speed via a coupling device such as a chain, etc. Specifically, engine-driven pump 86 may circulate coolant through passages in the engine block, head, etc., to absorb engine heat, which is then transferred via radiator 80 to ambient air. In one example, where engine-driven water pump 86 is a centrifugal pump, the pressure (and resulting flow) produced by the pump may be proportional to a speed of a crankshaft of the engine 10, which may be directly proportional to engine speed. The temperature of the coolant may be regulated by a thermostat valve 38, located in cooling line 82, which may be kept closed until the coolant reaches a threshold temperature.

Coolant may flow through coolant line 82, as described above, and/or through coolant line 84 to heater core 55 where the heat may be transferred to passenger compartment 104 before the coolant flows back to engine 10. Coolant may additionally flow through a coolant line 81 and through one or more of electric machine (e.g., motor) 52 and system battery 58 to absorb heat from the one or more of electric machine 52 and system battery 58, particularly when vehicle 102 is an HEV or an electric vehicle. In some examples, engine-driven water pump 86 may operate to circulate the coolant through each of coolant lines 81, 82, and 84.

In the HVAC system 110, condenser 88 is coupled to an air conditioning (AC) system comprising a compressor 87, a receiver drier 83, a first expansion valve 89, and an evaporator 85 coupled to a blower (not shown). Compressor 87 may be coupled to engine 10 via FEAD 36 and an electromagnetic clutch 76 (also known as compressor clutch 76), which allows the compressor to engage or disengage from the engine based on when the air conditioning system is turned on and switched off. Compressor 87 may pump pressurized refrigerant to condenser 88, mounted at the front of the vehicle. Condenser 88 may be cooled by cooling fan 91 which draws air across the condenser 88 and the radiator 80, as indicated by arrows 101, thereby, cooling both the refrigerant as it flows through the condenser 88 and coolant as it flows through the radiator 80. The high pressure refrigerant exiting condenser 88 may flow through receiver drier 83 where any moisture in the refrigerant may be removed by the use of desiccants. First expansion valve 89 may then depressurize the refrigerant and allow it to expand before it enters evaporator 85 where it may be vaporized into gaseous form as passenger compartment 104 is cooled. Evaporator 85 may be coupled to a blower fan operated by a motor (not shown), which may be actuated by system voltage.

The HVAC system 110 may be further coupled to a fuel system, such as fuel system 200 of FIG. 2, described further below, through a refrigerant-fuel heat exchanger 150. The refrigerant-fuel heat exchanger 150 may disposed in a bypass 140 that branches from a path of refrigerant flow through the HVAC system 110. In one example, the cooled refrigerant may flow through a first channel in the refrigerant-fuel heat exchanger 150 in contact with a second channel flowing fuel therethrough. The fuel may be higher in temperature than the refrigerant. The first channel may be separate from the second channel, e.g., fluid is not mixed or exchanged between the first and second channels, but heat may be absorbed by the refrigerant from the fuel, thereby cooling the fuel in the fuel system.

The refrigerant-fuel heat exchanger, hereafter, low temperature (LT) heat exchanger 150 may be coupled to the fuel system 200 by passages circulating fuel therethrough. The fuel flows continuously through the LT heat exchanger 150, regardless of a status of the HVAC system 110. For example, as shown in a first configuration in FIG. 1A, the bypass 140 may be directly coupled to the evaporator 85. When a bypass valve 161, arranged in the bypass 140, is opened, refrigerant flows through the bypass 140, as indicated by arrow 141, to the LT heat exchanger 150. Heat from the fuel may be transferred to the refrigerant, thus lowering temperature of the fuel before the fuel returns to the fuel system 200.

As refrigerant passes through the LT heat exchanger 150, heat is transferred from the fuel to refrigerant, thereby reducing a temperature of the fuel to below ambient temperature. Thus, when the bypass valve 161 is closed, refrigerant does not flow through the LT heat exchanger is fuel is not cooled. When the bypass valve is opened 161, heat exchange between refrigerant and the fuel is enabled.

By positioning the bypass valve 161 in the bypass 140 circulating refrigerant, fuel flow is not adversely affected by directing the fuel to the LT heat exchanger 150. Fuel injection and combustion is not altered by opening of the bypass valve 161 to cool the fuel. Furthermore, by allowing fuel to flow continuously through the LT heat exchanger 150, all fuel in the fuel system 200 passes through the LT heat exchanger 150 to be cooled by refrigerant when the bypass valve 161 is open, allowing maximum cooling of the fuel.

Figure 1A:
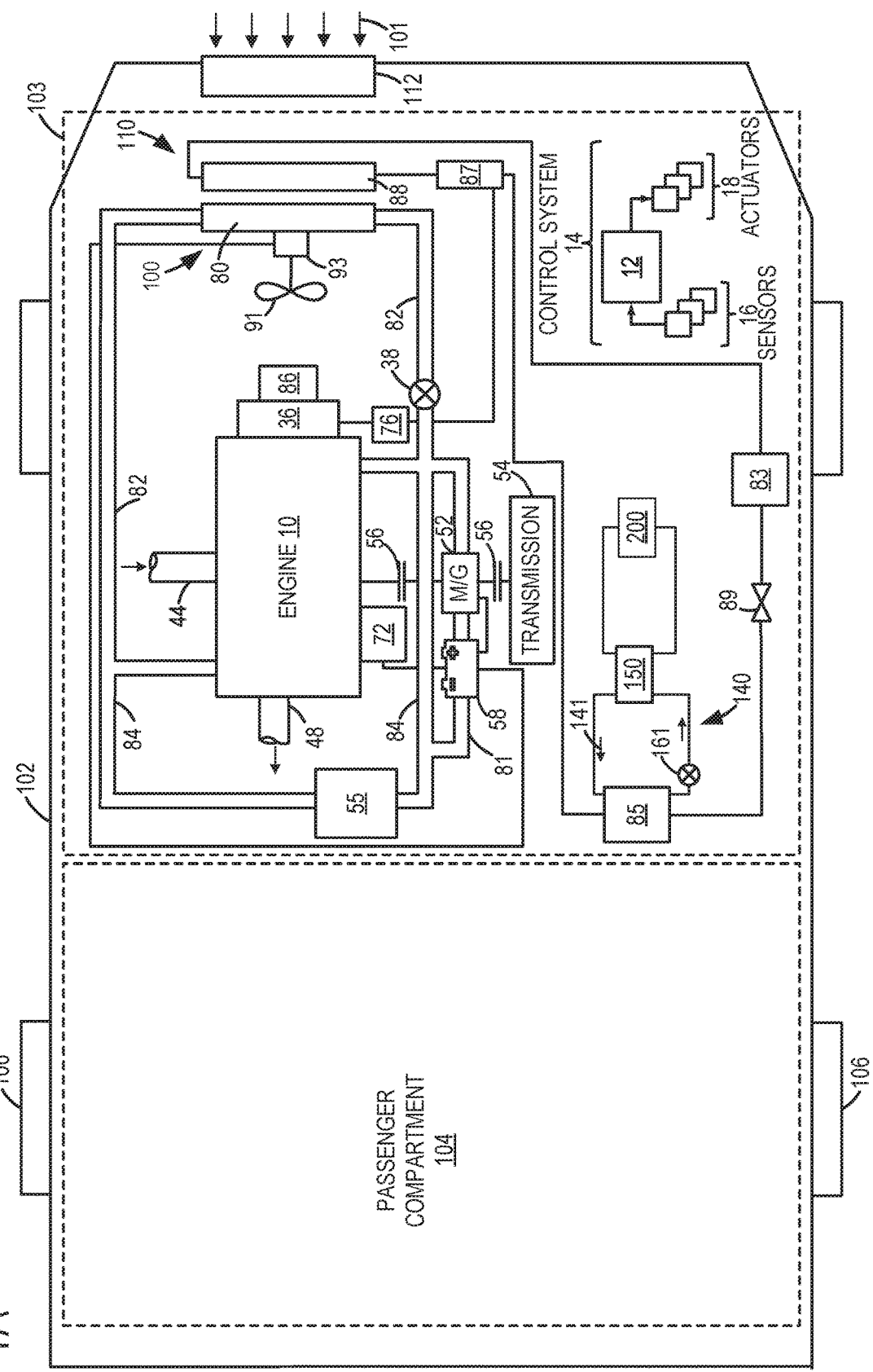
FIG. 1A shows an example of a vehicle with a first example of an HVAC system providing cooling to a passenger compartment of the vehicle.
Figure 1B:
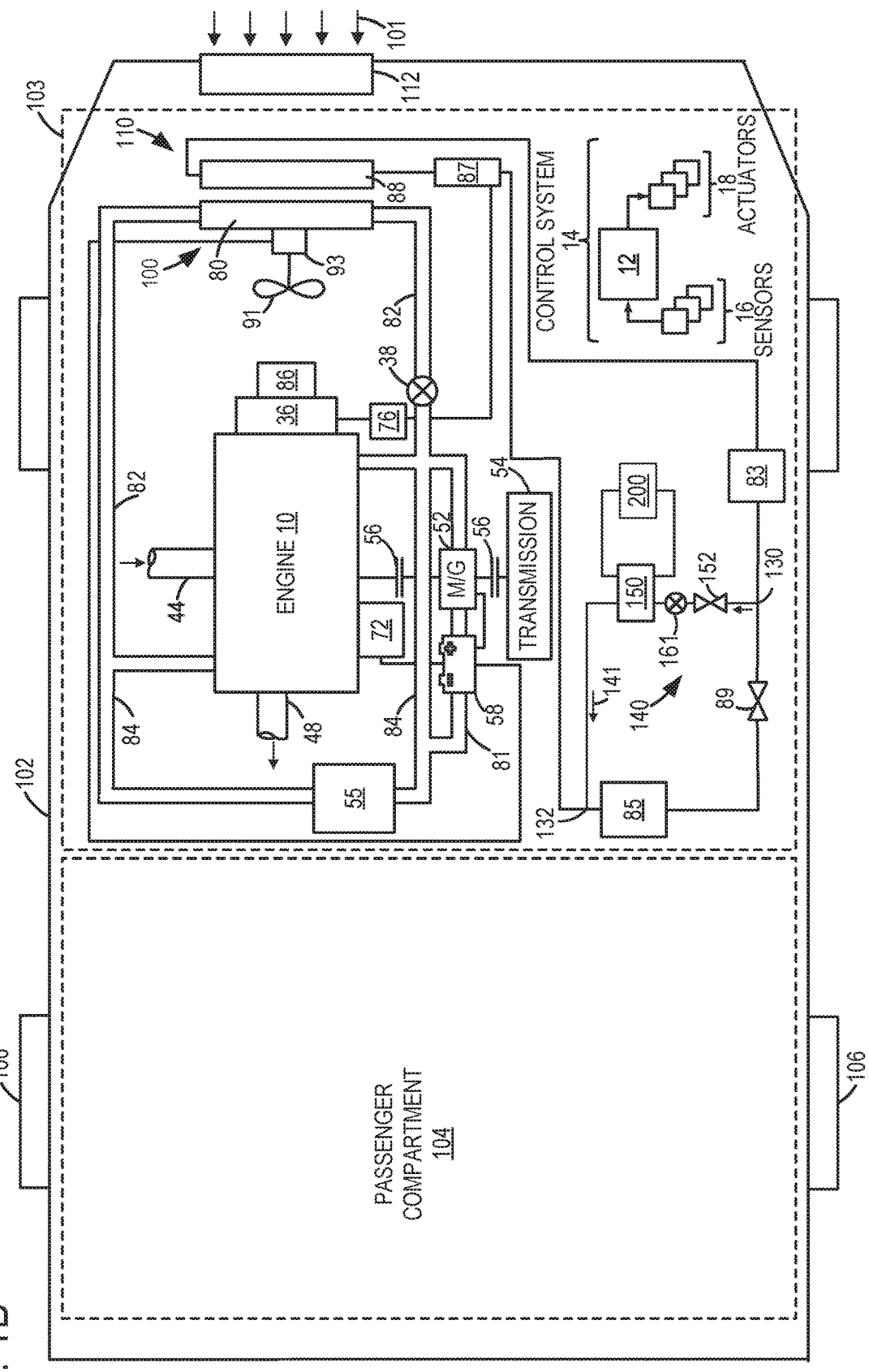
FIG. 1B shows the vehicle of FIG. 1 with a second example of the HVAC system providing cooling to the passenger compartment of the vehicle.

The LT heat exchanger 150 is shown in a first configuration in FIG. 1A with the bypass 140 directly coupled to the evaporator 85. In other examples, however, the bypass 140 may branch directly from passages of the HVAC system 110. For example, as shown in a second configuration in FIG. 1B, in inlet 130 of the bypass 140 may branch from a passage of the HVAC system 110 downstream of the receiver drier 83 and upstream of the first expansion valve 89. An outlet 132 of the bypass 140 may couple to the HVAC system 110 downstream of the evaporator 85, thus diverting refrigerant around the evaporator 85 and around the first expansion valve 152 when the bypass valve 161 is open. Refrigerant flow through the bypass 140 is indicated by arrows 141.

A second expansion valve 152 may be arranged in the bypass 140 upstream of the bypass valve 161. As such, refrigerant undergoes expansion regardless of a position of the bypass valve 161. As refrigerant flows through the LT heat exchanger 150, arranged in the bypass 140 downstream of the bypass valve 161, fuel from the fuel system 200 flows through the LT heat exchanger 150 concurrently. The fuel is thus cooled by the LT heat exchanger 150. The configuration of the HVAC system 110 shown in FIG. 2B may be used when an expansion valve in addition to the first expansion valve 89 of the HVAC system 110 is demanded.

Figure 1C:
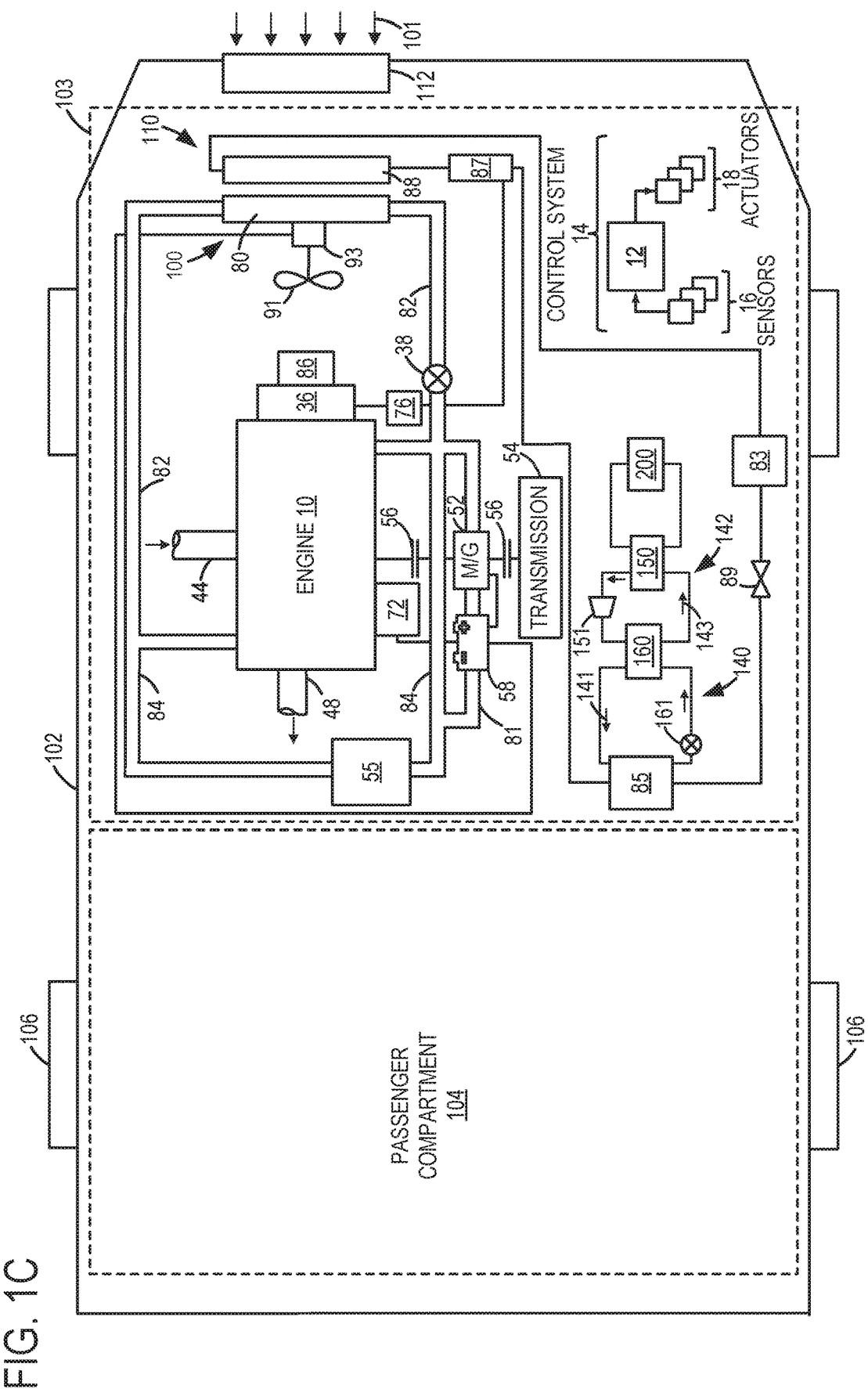
FIG. 1C shows the vehicle of FIG. 1 with a third example of the HVAC system providing cooling to the passenger compartment of the vehicle.
Figure 1D:
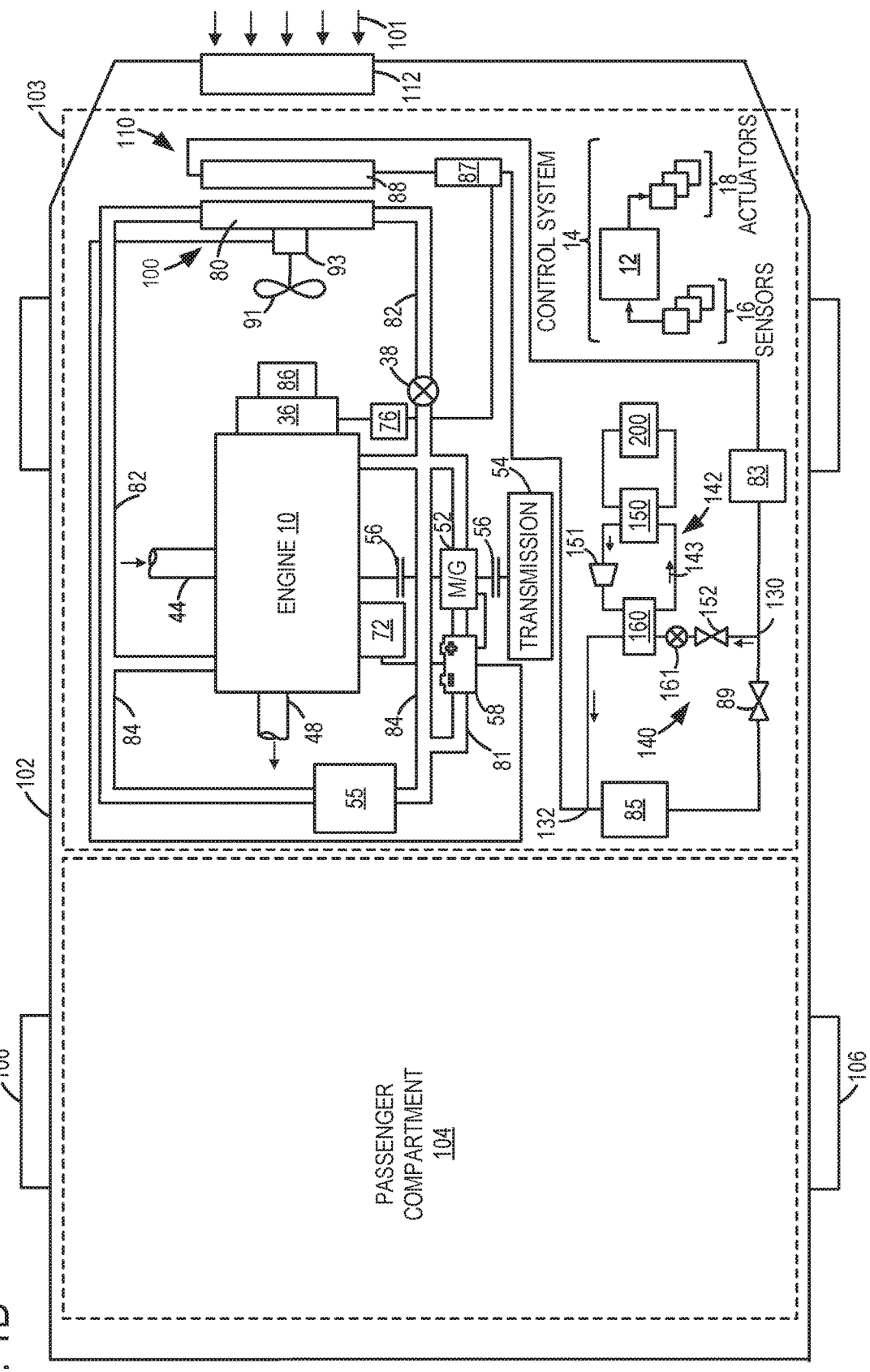
FIG. 1D shows the vehicle of FIG. 1 with a fourth example of the HVAC system providing cooling to the passenger compartment of the vehicle.

In other examples, as shown in a third configuration and a fourth configuration in FIGS. 1C and 1D, respectively, an intermediary cooling fluid may be flowed through the LT heat exchanger 150 to facilitate heat exchange with the fuel of the fuel system 200. For example, as illustrated in FIG. 1C, the bypass 140 may be similarly coupled to the evaporator 85 as shown in FIG. 1A. However, an intermediate heat exchanger 160 may be arranged in the bypass 140 instead of the LT heat exchanger 150. The intermediate heat exchanger 160 may circulate an intermediary cooling fluid, such as a coolant, through a first channel of the intermediate heat exchanger 160 and refrigerant through a second channel. Heat is transferred from the intermediary cooling fluid to refrigerant, thus reducing a temperature of the intermediary cooling fluid to below ambient temperature.

The intermediate heat exchanger 160 is also coupled to a secondary circuit 142 that includes the LT heat exchanger 150. The intermediary cooling fluid is circulated through the secondary circuit 142, as indicated by arrows 143, by a pump 151. Similar to the configurations of FIGS. 1A and 1B, fuel is circulated between the fuel system 200 and the LT heat exchanger 150. The intermediary cooling fluid, cooled by refrigerant, in turn cools the fuel via heat exchange at the LT heat exchanger 150.

The intermediate heat exchanger 160 and secondary circuit 142 may also be included in a fourth configuration shown in FIG. 1D. The bypass 140 is coupled to the HVAC system 110 in a similar arrangement as depicted in FIG. 1B, branching from passages of the HVAC system 110. The second evaporator 152 is included in the bypass 140, positioned upstream of the bypass valve 161. Refrigerant and the intermediary cooling fluid exchange heat at the intermediate heat exchanger 160 while fuel and the intermediary cooling fluid exchange heat at the LT heat exchanger 150 which is coupled to both the secondary circuit 142 and the fuel system 200. Flow of the intermediary cooling fluid through the secondary circuit 142 may be driven by the pump 151. The fourth configuration of FIG. 1D may be used when use of both an additional expansion valve and an intermediary cooling fluid is demanded.

As described above, refrigerant may flow continuously through the LT heat exchanger 150 regardless of whether compressor 87 is operating and actively cycling the refrigerant through the HVAC system 110 or deactivated. The fuel temperature may be reduced to below ambient temperature at the LT heat exchanger 150 during events where compressor 87 is actively cycling the refrigerant through compressive and evaporative phases of the HVAC system 110 and the bypass valve 161 is open. Active cycling of the refrigerant may be initiated based on fuel temperature when compressor 87 is not already on and compressing refrigerant.

By enabling heat transfer between the HVAC system 110 and the fuel in the fuel system of vehicle 102, the fuel may be cooled to temperatures below ambient temperature, e.g., a temperature of air surrounding vehicle 102, prior to pressurization of the fuel and delivery at fuel injectors of engine 10. Cooling the fuel may enable a quantity of fuel combusted at engine 10 to provide a desired level of torque output. A quantity of fuel delivered to engine 10 may be maintained at or below a maximum deliverable quantity of the fuel system. The maximum deliverable quantity may vary based on fuel temperature where higher fuel temperature leads to a decreased maximum deliverable quantity. A likelihood of both a malfunction indicator lamp (MIL) being triggered and misdiagnosis of fuel delivery is thereby reduced. Further details of heat transfer between the HVAC system 110 and the fuel system of vehicle 102 are provided further below, with reference to FIGS. 2-4.

As shown in FIGS. 1A-1D, one or more blowers (not shown) and cooling fans may be included in cooling system 100 to provide airflow assistance and augment a cooling airflow (as indicated by arrows 101) through the under-hood components. For example, cooling fan 91, may be operated when the vehicle is moving and the engine is running to provide cooling airflow assistance through condenser 88 and radiator 80. The cooling fan 91 may be coupled behind radiator 80 (when looking from a grille 112 toward engine 10). In one example, cooling fan 91 may be configured as a bladeless cooling fan. That is, the cooling fan may be configured to emit airflow without the use of blades or vanes, thereby creating an airflow output area that is absent of vanes or blades. Cooling fan 91 may draw a cooling airflow into under-hood compartment 103 through an opening in the front-end of vehicle 102, for example, through grille 112. Such a cooling airflow may then be utilized by radiator 80, condenser 88, and other under-hood components (e.g., fuel system components, batteries, etc.) to keep the engine and/or transmission cool. Further, the airflow may be used to reject heat from components of the HVAC system 110. Further still, the airflow may be used to increase the performance of a turbocharged/supercharged engine that is equipped with intercoolers that reduce the temperature of the air that goes into an intake manifold of the engine. While this embodiment depicts one cooling fan, other examples may use more than one cooling fan.

Cooling fan 91 may be coupled to battery-driven motor 93. Motor 93 may be driven using power drawn from system battery 58. In one example, system battery 58 may be charged using electrical energy generated during engine operation via alternator 72. For example, during engine operation, engine generated torque (in excess of what is required for vehicle propulsion) may be transmitted to alternator 72 along a drive shaft (not shown), which may then be used by alternator 72 to generate electrical power, which may be stored in an electrical energy storage device, such as system battery 58. System battery 58 may then be used to activate battery-driven (e.g., electric) fan motor 93. In other examples, the cooling fan may be operated by enabling a variable speed electric motor coupled to the cooling fan 91. In still other examples, cooling fan 91 may be mechanically coupled to engine 10 via a clutch (not shown), and operating the cooling fan may include mechanically powering rotation from engine rotational output via the clutch.

System voltage from the system battery 58 may also be used to operate other vehicle components such as an entertainment system (radio, speakers, etc.), electrical heaters, windshield wiper motors, a rear window defrosting system, and headlights.

FIG. 1 further shows a control system 14. Control system 14 may be communicatively coupled to various components of engine 10 to carry out the control routines and actions described herein. For example, as shown in FIG. 1, control system 14 may include controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 16, which may include user inputs and/or sensors (such as transmission gear position, gas pedal input, brake input, transmission selector position, vehicle speed, engine speed, engine temperature, ambient temperature, intake air temperature, etc.), cooling system sensors (such as coolant temperature, fan speed, passenger compartment temperature, ambient humidity, etc.), and others (such as Hall Effect current sensors from the alternator and battery, a system voltage regulator, etc.). Further, controller 12 may communicate with various actuators 18, which may include engine actuators (such as fuel injectors, an electronically controlled intake air throttle plate, spark plugs, etc.), cooling system actuators (such as motor actuators, motor circuit relays, etc.), and others. As an example, controller 12 may send a signal to an actuator of clutch 56 to engage or disengage the clutch, so as to connect or disconnect the crankshaft of engine 10 from transmission 54 and the components connected thereto. In some examples, the storage medium may be programmed with computer readable data representing non-transitory instructions executable by the processor for performing the methods described below as well as other variants that are anticipated but not specifically listed.

As described above, an HVAC system of a vehicle may be configured to exchange heat with a fuel system of the vehicle, leveraging cooling of refrigerant used to provide air conditioning to a passenger compartment of the vehicle to absorb heat from fuel delivered via the fuel system. The refrigerant may absorb heat from the fuel either directly, by flowing the refrigerant and the fuel through individual sets of passages that are in contact with one another but not fluidly coupled, or through an intermediary fluid. Lowering a temperature of the fuel prior to combustion at combustion chambers of the vehicle's engine may increase a torque output of the engine.

More specifically, the fuel temperature may be reduced to below ambient temperature when cooled via heat exchange with the HVAC system which may provide enhanced engine performance relative to conventional methods for cooling fuel, such via heat exchange with ambient air. For example, in regions where seasonal temperatures may be high, e.g., areas with hot summers, cooling to ambient temperature may not sufficiently decrease the fuel temperature to a target temperature range for fuel combustion during high engine loads. The target fuel temperature range may directly affect a quantity of fuel to be injected, resulting from a variability of fuel density with temperature. Thus a maximum deliverable quantity of a single fuel injection event is a function of fuel temperature, where higher fuel temperatures result in reduced maximum deliverable quantities.

In some examples, a desired fuel injection quantity may exceed the maximum deliverable quantity due to a high fuel temperature. The engine controller, e.g., controller 12 of FIG. 1, may not detect the inability of the maximum deliverable fuel quantity to meet the amount demanded by engine speed and load. The actual amount of fuel may be lower than the requested amount, reducing torque output of the engine. A disconnect, e.g., lack of unity, between the requested and delivered fuel quantity may disrupt fuel and torque monitoring routines at the controller. In one example, the mismatch between requested and delivered fuel may lead to a MIL being displayed to alert an operator.

In other examples, a fuel shortfall, e.g., a difference between a delivered amount and a commanded amount that is equal to or greater than a threshold difference, may be detected by the controller. In such an example, detection of the shortfall mitigates the disconnect between the requested and delivered fuel quantity. As such, the controller does not trigger the MIL. However, engine output may not be able to meet a torque demand.

Furthermore, high fuel temperature may also cause an increased likelihood of leaks occurring at a high-pressure fuel pump of the fuel system. Fuel pump leakage may erode an ability of the pump to reach and/or hold a desired fuel rail pressure. If the rail pressure deviates from the desired rail pressure by greater than a threshold amount, the MIL may be triggered. Deviations that are less than the threshold amount may activate controller strategies to reduce engine fueling to allow the engine to maintain the desired rail pressure, thereby also reducing engine output.

Thus, reducing fuel temperature may mitigate the issues described above. In particular, interfacing the fuel system with the HVAC system to lower fuel temperature below ambient temperature may provide enhanced mitigation of undesirably high fuel temperature. Components and configurations of a fuel system which may be adapted to exchange heat with an HVAC system are described next, with reference to FIG. 2.

As shown in FIG. 2, a detailed depiction of a fuel system 200 that supplies fuel to an engine of a vehicle is provided. The fuel system of FIG. 2 may be configured to supply fuel to the engine 10 of FIG. 1 and may be controlled by controller 12, Fuel system 200 includes a fuel tank 204 for storing the fuel on-board the vehicle, a low pressure pump or lift pump 206, a high pressure pump 256, and fuel rail 222. Fuel may be supplied from fuel tank 204 to the low pressure pump 206 which then pumps fuel to high pressure fuel pump 256. Fuel in high pressure fuel pump 256 is then directed into fuel rail 222, which in turn supplies pressurized fuel to fuel injectors 66. Fuel injectors 66 may be coupled to combustion chambers or cylinders of the engine (e.g., engine 10 of FIG. 1) and fuel rail 222 may provide fuel to one cylinder bank of the engine via fuel injectors 66. In other examples, another fuel rail (not shown) supplies fuel to a second cylinder bank of the engine, also via fuel injectors. In other examples, fuel rail 222 and fuel injectors 66 may be coupled to more than one cylinder bank of the engine.

High pressure pump 256 may include a fuel pump chamber 212, a camshaft 216, and a piston 202. Cam 216 is driven by the engine and provides motive force to piston 202 which operates on fuel in pump chamber 212. Low pressure pump 206 may be, in one example, an electronic return-less pump system which may be operated intermittently in a pulse mode. Operation of high pressure pump 256 drives flow of pressurized fuel along fuel line 224 extending between high pressure pump 256 and fuel rail 222. High pressure pump 256 also has a pump return line 270 through which a portion of fuel that enters high pressure pump flow 256 is diverted to a first high temperature (HT) heat exchanger or cooler 254, arranged in a fuel return line 250 of fuel system 200. The portion of fuel flowing to the HT cooler 254 is not pressurized and may be used to cool the high pressure pump 256.

The fuel rail pressure in fuel rail 222 may be monitored by pressure sensor 220 and controlled via adjusting valves 208 and 226. In one example, fuel rail pressure control valve 226 may be positioned partially open during operating conditions such that at least a portion of fuel supplied by fuel pump 256 returns to fuel tank 204. In another example, fuel rail pressure control valves 226 may be at least partially opened an additional amount during some conditions to reduce fuel pressure in the fuel rail 222. In other operating conditions, an opening of fuel rail pressure control valve 226 may be reduced to increase fuel pressure in fuel rail 222. In another example, fuel rail pressure control valve 226 may be controlled separately from fuel pump flow metering valve 208 so that fuel pressure in fuel rail 222 may be adjusted by one valve or by a combination of valves to provide a desired fuel pressure response. Fuel pump flow metering valve 208 may be used to control the amount of fuel entering high pressure fuel pump 256. In addition, a first check valve 210, positioned between low pressure pump 206 and high pressure pump 256, only allows fuel to flow to high pressure fuel pump 256 in one direction and limits back flow from high pressure fuel pump 256. Similarly, a second check valve 218 may be arranged directly downstream of high pressure fuel pump 256 to direct fuel in one direction, towards fuel rail 222, and limit back flow from fuel rail 222.

Fuel temperature is monitored by temperature sensor 231. Sensor 231 senses fuel temperature before fuel pump 256 performs work on the fuel. In some examples, fuel temperature may also be measured at sensor 230 and sensor 233. Sensor 230 senses fuel temperature after fuel pump 256 performs work on the fuel and may be placed at fuel rail 222 if desired. Furthermore, fuel temperature may also be sensed in fuel return line 250 via temperature sensor 233 arranged downstream of a high temperature cooler 254, as described further below. Similar to FIGS. 1A-1D, controller 12 may receive fuel pressure signals from pressure sensor 220 coupled to fuel rail 222. Fuel rail 222 may additionally contain one or more temperature sensors for sensing the fuel temperature within the fuel rails. Controller 12 may also activate low pressure fuel pump 206 to supply fuel to fuel pump flow metering valve 208. Controller 12 may further control operations of intake and/or exhaust valves or throttles, engine cooling fan, spark ignition, injector and fuel pumps 206 and 256 to control engine operating conditions. In addition, controller 12 may regulate the amount or speed of fuel into fuel rail 222 by lift pump 206 through respective fuel pump controls (not shown).

Fuel injectors 66 may be operatively coupled to and controlled by controller 12, as is shown in FIG. 2. An amount of fuel injected from each injector and the injection timing may be determined by controller 12 from an engine map stored in the controller 12 on the basis of engine speed and/or intake throttle angle, or engine load. Each injector may be controlled via an electromagnetic valve coupled to the injector (not shown).

As described above, fuel may be delivered by fuel injector 66 over a plurality of injections during a combustion cycle. The plurality of injections may include multiple injections during the compression stroke, multiple injections during the intake stroke, or a combination of some direct injections during the compression stroke and some during the intake stroke. In some examples, e.g., for diesel engines, the plurality of injections may be injected during an expansion stroke. Fuel injection may also include a number of pilot injections prior to main injection and/or one or more post injections. The pilot injection(s) typically begin during a compression stroke at a predetermined crank angle before top dead center (BTDC) and prior to the main injection(s). Pilot injection typically injects a substantially smaller fuel quantity, e.g. 1-20% of the total injected fuel depending upon the total quantity demanded, compared to the subsequent main injection fuel quantity which may be as much as 55-95% of the total fuel. The main injection may be injected before or after TDC, however, it is typically injected after TDC. In addition, under selected conditions, more than one pilot injection and/or more than one main injection may be performed during the compression stroke of the compression ignition engine. The timing and duration of the pilot and main injections may be adjusted based on various parameters, such as noise, vibration and harshness (NVH) parameters, engine in-cylinder peak pressure, engine load conditions, etc. Post injection is provided to regenerate particulate filters in the diesel engines and is generally performed after TDC with up to 10% of the total fuel. During low engine loads, an amount of post injected fuel may be over 50% of the total fuel. The sum of the pilot and the main fuel injection quantity, which may also include a portion of the post injection, is the total fuel quantity needed to sustain the engine in order to meet the operator torque request at a given operating condition. The total fuel quantity needed may be determined by controller 12 based on an estimated engine operating condition, for example.

Metering of fuel may be affected by fuel temperature due to changes in fuel density as temperature varies. As fuel density decreases, a metered amount of fuel delivered by the fuel injectors 66 may be less than a desired amount to provide an engine torque output that meets a torque demand. In some examples, the fuel return line 250 may include the HT cooler 254 that enables heat transfer from fuel to a lower temperature (and/or high boiling point) medium flowing through or across the HT cooler 254. However, the HT cooler 254 does not reduce fuel temperature to below ambient temperature. When adapted to transfer heat from fuel flowing through the HT cooler 254 to ambient air blowing across the HT cooler 254, a blower or fan may be positioned adjacent to the HT cooler 254 to enhance air flow across surfaces of the HT cooler 254.

In another example, the HT cooler 254 may be a coolant-fuel cooler that allows the fuel to be cooled via heat exchange with an engine coolant (such as water). Alternatively, the HT cooler 254 may be an oil-fuel heat exchanger that transfers heat from fuel to oil flowing through a lubrication system of the engine. The HT cooler 254 may be coupled to a region of the lubrication system such as, for example, downstream of an oil cooler. Furthermore, the HT cooler 254 may be arranged anywhere along the pump return line 270 or along the fuel return line 250. In some examples, the HT cooler 254 may be positioned between the low pressure pump 206 and the high pressure pump 256, upstream of a LT heat exchanger, which may be the LT heat exchanger 150 of FIGS. 1A-1D.

As such, the fuel (e.g., fuel from the fuel injectors 66 and from high pressure pump 256) may be additionally cooled by flowing the fuel through the low temperature (LT) heat exchager 150, used in addition to the HT cooler 254 where the HT cooler 254 may be an air-fuel cooler, an oil-fuel cooler, or a coolant-fuel cooler. In some examples, more than one LT heat exchanger 150 may be included in the fuel system 200. The LT heat exchanger 150 may be arranged in series with the HT cooler 254 downstream of the low pressure pump 206 and upstream of the high pressure pump 256. In this way, a temperature of fuel flowing through fuel return line 250 is first reduced to ambient temperature (or above ambient temperature) via heat exchange with HT cooler 254. The fuel temperature is further reduced upon interaction with the LT heat exchanger 150.

The LT heat exchanger 150 may be directly to both the fuel system 200 and the HVAC system 110 of FIGS. 1A-1D similar to the first and third configurations illustrated in FIGS. 1A and 1B, respectively, as indicated by first dashed area 223. Alternatively, the LT heat exchanger 150 may be indirectly coupled to the HVAC system 110 via the intermediate heat exchanger 160 of FIGS. 1C and 1D, as indicated by second dashed area 225, the intermediate heat exchanger 160 circulating the intermediary cooling fluid. The LT heat exchanger 150 is shown in FIG. 2 positioned downstream of the adjusting valve 208 and sensor 231 but may be arranged in between the adjusting valve 208 and the sensor 231 or upstream of the adjust valve 208, in other examples.

A temperature of the fuel entering the first check valve 210 may be lower a temperature of the fuel upstream of the LT heat exchanger 150 when the fuel is cooled by refrigerant cycled through the HVAC system 110. Thus the temperature of the fuel is reduced prior to pressurization at the high pressure pump 256 as well as prior to injection at the injectors 66. Active cooling of the fuel at the LT cooler via heat exchange with circulating refrigerant may be adjusted based on a temperature of the fuel measured at sensor 233 and regulation of a bypass valve, such as the bypass valve 161 of FIGS. 1A-1D. For example, an opening of the bypass valve 161 may be continuously varied between a closed (e.g., fully closed) position and a fully open position, including partially open positions in between. The opening of the bypass valve 161 may be increased to increase fuel cooling and decreased to reduce fuel cooling or closed to terminate refrigerant flow through the LT heat exchanger 150.

Fuel temperature may rise due to work performed on the fuel by high pressure pump 256, thus arranging the LT heat exchanger 150 upstream of high pressure pump 256 may offset fuel heating caused by high pressure pump 256. In some examples, temperature sensors may be positioned upstream and downstream of the LT heat exchanger 150 to monitor a cooling effect of the LT heat exchanger 150. For example, fuel temperature measured an addition temperature sensor positioned between the LT heat exchanger 150 and high pressure pump 256 may be compared with fuel temperature measured by sensor 231.

In one example the low pressure pump 206 may be configured as a diesel fuel conditioning module (DFCM) 206. The fuel flowing through fuel return line 250 from the HT cooler 254 may be filtered at the DFCM 206 and either recirculated to high pressure pump 256 or returned to fuel tank 204 depending on the temperature of the fuel. For example, if the fuel temperature is higher than a threshold temperature, the fuel may be channeled to fuel tank 204 so that the fuel is passed through LT heat exchanger 150 and if the fuel temperature is lower than the threshold temperature, the fuel is sent directly to high pressure pump 256.

In some examples, the monitored fuel temperature change may be used by the controller to adjust cooling of the fuel at the LT heat exchanger 150. For example, as described above, an amount of refrigerant diverted through a bypass in which the LT heat exchanger 150 is arranged, e.g., the bypass 140 of FIGS. 1A-1D, may be adjusted. In addition, a rate of refrigerant flow through the HVAC system may be varied to either increase or decrease heat transfer from the fuel to the refrigerant.

An HVAC system of a vehicle may be configured to operate, e.g., activate a compressor, when a fuel temperature in a fuel system of the vehicle rises above a threshold temperature. However, interfacing the fuel system with the HVAC system to facilitate heat transfer may impose additional stress on the compressor. During some instances, fuel cooling to below ambient temperature may be desired when the HVAC system is already providing passenger compartment cooling or when a request for passenger compartment cooling is received. Operating the compressor to concurrently provide passenger compartment cooling and fuel cooling may surpass an ability of the compressor to meet the combined cooling demands. The controller may command prioritizing passenger comfort over fuel cooling to below ambient temperature. As a result, heat exchange with a refrigerant of the HVAC system may be inhibited by, for example, closing a bypass valve, such as the bypass valve 161 of FIGS. 1A-1D, in a bypass providing a path refrigerant parallel with at least a portion of the HVAC system. The bypass includes a LT heat exchanger, e.g., the LT heat exchanger 150 of FIGS. 1A-2, configured to cool fuel to below ambient temperature Closing the bypass valve may allow a cooling capacity of the refrigerant to be directed entirely towards cooling the passenger compartment. When the bypass valve is closed, the fuel may still be at least moderately cooled by an HT cooler, such as the HT cooler 254 of FIG. 2. The HT cooler may be an air-fuel, an oil-fuel, or a coolant-fuel cooler arranged in the fuel system. Furthermore, the fuel flows continuously through the LT heat exchanger whether the bypass valve is open or closed. By continually flowing the fuel through the LT heat exchanger, fuel flow is not affected by adjusting a position of the bypass valve. Fuel injection is thus not altered by fuel cooling at the LT heat exchanger.

A method 300 is shown in FIG. 3 for cooling fuel in a fuel system of a vehicle prior to injection at engine cylinders of the vehicle by enabling heat to be transferred from the fuel to refrigerant flowing through an HVAC system of the vehicle. The HVAC system may be the HVAC system 110 included in vehicle 102 in FIGS. 1A-1D, adapted with a bypass with a bypass valve in which a heat exchanger is arranged, and the fuel system may be the fuel system 200 shown in FIG. 2. The fuel system may include a cooler arranged along a fuel return line of the fuel system, configured to moderately lower a temperature of the fuel. For example, the cooler may cool the fuel down to ambient temperature. At least one heat exchanger may be coupled to both the fuel system and the HVAC system, maintaining flow of fuel and flow of refrigerant separate and sealed from one another, e.g., the systems are not fluidly coupled, while enabling heat transfer from the fuel to the refrigerant to cool the fuel below ambient temperature. The heat exchanger may be directly coupled to the fuel system and the HVAC system, as shown in FIGS. 1A and 1B, or indirectly coupled to the HVAC system via an intermediate heat exchanger, as shown in FIGS. 1C and 1D. The heat exchanger may be positioned in between a low pressure pump and a high pressure pump of the fuel system. Instructions for carrying out method 300 and the rest of the methods included herein may be executed by the controller based on non-transitory instructions stored on a memory of the controller and in conjunction with signals received from sensors of the engine system, such as the sensors described above with reference to FIGS. 1A-1D. For example, the controller may receive information about fuel temperature from temperature sensors, such as sensors 230, 231, and 233 of FIG. 2, and adjust fuel cooling based on the temperature data. The controller may employ engine actuators of the engine system to adjust engine operation, according to the methods described below.

At 302 the method includes estimating and/or measuring engine operating conditions. For example, an engine speed may be determined by a crank position sensor, a fuel temperature and refrigerant temperature may be measured by temperature sensors, torque output of the engine may be modeled based on engine rpm data provided by a tachometer, etc. The fuel temperature is compared to a first threshold at 304. The first threshold is a fuel temperature above which a difference between an actual amount of injected fuel and a commanded amount of injected fuel is greater than a threshold fuel injection amount difference. For example, the first threshold may be a fuel temperature of 60-80° C.

That is, the first threshold may be a predetermined fuel temperature above which the actual amount of injected fuel is less than the commanded amount of injected fuel by greater than the threshold fuel injection amount difference. For example, the actual injected amount of fuel may be less than the commanded amount of injected fuel by greater than the threshold fuel injection amount difference due to a density of the injected fuel being below a fuel density threshold. However, the amount of fuel that matches a torque demand, when reduced density is taken into account, may exceed a maximum deliverable quantity of fuel at a fuel injector of the engine.

In other examples, the controller may determine if a shortfall in an amount of fuel injected at the engine cylinders is detected instead of monitoring the fuel temperature. When the fuel temperature is heated beyond a threshold, such as the first threshold, the density of the fuel may be decreased, as described above, leading to an actual amount of injected fuel being less than a desired amount. As such, the first threshold may be a threshold difference between an actual torque output of the engine and a commanded torque output. In at least one example, the threshold torque difference may be 15-25 Nm. In yet another example, the first threshold may be a pressure of the fuel rail. For example, the first threshold may be a fuel rail pressure of 100-150 bar. When the fuel rail pressure rises above the first threshold, heating and density reduction of the fuel may be indicated.

If the fuel temperature does not reach or exceed the first threshold, the method continues to 306 to continue operating the engine under current conditions, such as current spark ignition timing, fuel injection timing and quantity, etc. The method returns to the start. Responsive to the fuel temperature reaching or passing the first threshold, the method proceeds to 308 to measure an ambient temperature (e.g., temperature of air surrounding the vehicle) and compare a difference between the fuel temperature and the ambient temperature to a second threshold. The second threshold may be a temperature margin enabling cooling of the fuel to below the first threshold by heat transfer from the fuel to ambient air at, for example, the cooler in the fuel system, when configured as an air-fuel cooler. For example, the second threshold may be a difference of 20 degrees, where the ambient air temperature is lower than the fuel temperature. In other examples, the second threshold may be a difference between the ambient air temperature and the fuel temperature of between 10-30 degrees.

Alternatively, an oil-fuel cooler may be arranged in the fuel system of the vehicle instead of the air-fuel cooler, as described above. The fuel is cooled by engine oil rather than ambient air in such a configuration. The second threshold may be a difference between a temperature of the oil downstream of an oil cooler and the fuel temperature.

If the temperature difference between the fuel and ambient air reaches or exceeds the second threshold, the fuel continues being cooled exclusively via the cooler at 310. Ambient air may flow across a fuel channel of the cooler, absorbing heat from the fuel. The cooled fuel is then supplied to the fuel rail and injected into the cylinders of the engine. Method 300 then returns.

If the temperature difference does not at least meet the second threshold, a temperature of the refrigerant is measured and a difference between the fuel temperature and the refrigerant temperature is compared to a third threshold at 312. The third threshold may be a similar temperature margin as the second threshold where the refrigerant temperature is lower than the fuel temperature by 20 degrees, or between 10-30 degrees.

The temperature of the refrigerant may vary depending on operation of the HVAC system as well as an operating mode of a compressor of the HVAC system. For example, the refrigerant may be flowing through the HVAC system but the compressor may not be actively compressing the refrigerant due to a low demand for cooling via the refrigerant. As such the refrigerant temperature may be higher than during increased cooling demand in the vehicle, where the compressor is actuated to perform compressive work on the refrigerant and the refrigerant is cycled between compressed and expanded stages in the HVAC system.

If the temperature difference between the fuel and refrigerant reaches or exceeds the third threshold, the method continues to 314 to determine whether a total cooling demand of the vehicle, relying on heat exchange via the refrigerant, surpasses a fourth threshold. If the difference between the fuel temperature and the refrigerant temperature does not reach the third threshold, the refrigerant may be cycled through the HVAC system at 320. For example, the compressor may be maintained active, if already cycling the refrigerant, or actuated to compress the refrigerant and deliver pressurized refrigerant to an expansion valve and then flowed to the evaporator, allowing the refrigerant to expand and cool. The refrigerant may thus be cooled sufficiently to provide a temperature margin between the fuel temperature and the refrigerant temperature equal to at least the third threshold. The method proceeds to 314 to compare the cooling demand to the fourth threshold.

At 314, the cooling demand may be estimated based on the temperature differential between the fuel and the refrigerant as well as a demand for passenger compartment or cabin cooling. The demand for cabin cooling may be inferred based on, for example, a difference between a temperature in the cabin and a target temperature, as indicated by an operator. The fourth threshold may be a maximum cooling capacity of the refrigerant. For example, in the HVAC system of the vehicle, the maximum cooling capacity of the refrigerant may be dependent on a maximum blowing speed of a blower directing air cooled by an evaporator into the cabin and/or on a maximum rotational speed of a fan blowing ambient air across a condenser of the HVAC system. As another example, the maximum cooling capacity of the refrigerant may be determined by a maximum amount of work performed on the refrigerant by the compressor of the HVAC system. If the cooling demand does not reach or exceed the fourth threshold, the method continues to 318 to cool the fuel at the heat exchanger (e.g., at least one heat exchanger). Fuel cooling may be performed concurrent with cabin cooling.

Cooling the fuel at the heat exchanger, arranged in paths of both the fuel system and the HVAC system, may include, at 322, opening the bypass valve and diverting at least a portion of the refrigerant through the bypass and into a first channel of the heat exchanger. In some examples, the portion of the refrigerant flow may be varied based on how much the bypass valve is opened if the bypass valve is configured to be continuously variable. For example, in response to the fuel temperature rising above the first threshold by a large margin such as 30 degrees, the bypass valve may be opened to a maximum amount to allow a maximum flow of refrigerant and maximum cooling of fuel through the heat exchanger. In response to the fuel temperature rising above the first threshold by a smaller margin, such as 5 degrees, an opening of the bypass valve may be opened to a lesser extent than the maximum opening to decrease an amount of refrigerant flowing through the heat exchanger.

Cooling the fuel may also include continuously flowing the fuel through a second channel of the heat exchanger at 324, separate from the first channel. The first and second channels do not exchange fluids at any point but are in contact with one another within the heat exchanger. Heat may thereby be transferred from the fuel to the refrigerant through walls of the first and second channels. In some examples, particularly when the bypass valve is not continuously variable and adjustable between fully closed and a fully open positions but no positions in between, an amount of cooling may be adjusted based on HVAC operations. For example, responsive to an increased demand for fuel cooling, the speed of the blower at the evaporator may be increased or the speed of the fan at the condenser may be increase. Conversely when less fuel cooling is requested, the speeds of the blower and the fan may be decreased.

At 328, the method includes adjusting engine operations responsive to the reduced fuel temperature. For example, a fuel injection timing and duration, an injection pressure, a spark timing, a boost level, and exhaust gas recirculation (EGR) in vehicles equipped with EGR, may be adjusted in response to variations in fuel temperature.

Returning to 314, if the cooling demand reaches or exceeds the fourth threshold, the controller commands prioritization of the demand for cabin cooling and fuel cooling is inhibited. Heat transfer from the fuel may be blocked by closing, or maintaining closed, the bypass valve. By closing the bypass valve, refrigerant does not flow through the one heat exchanger. The method then returns to the start.

Figure 4:
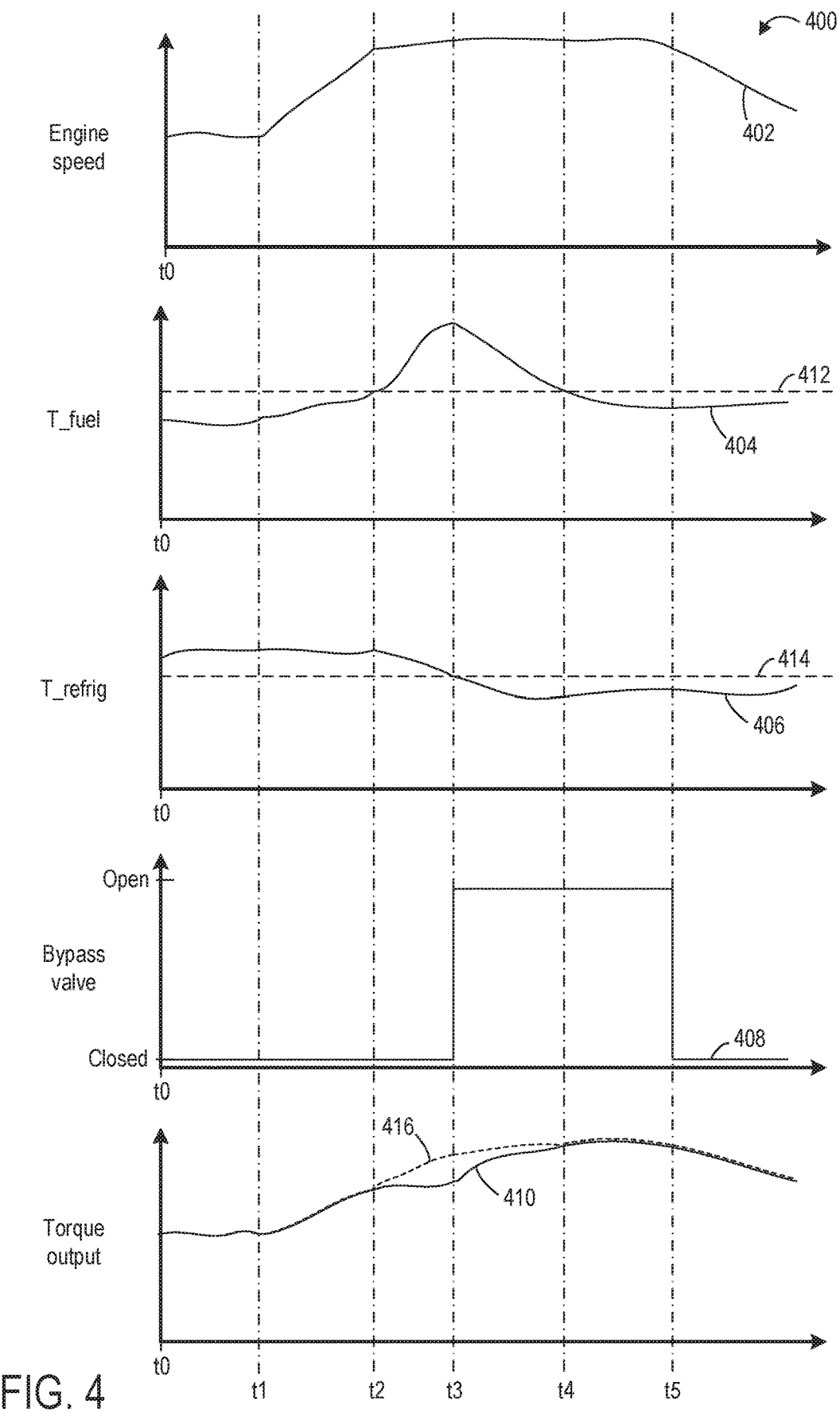
FIG. 4 shows example vehicle operations during fuel cooling via heat exchange between a fuel system and an HVAC system of a vehicle.

Example operations of an engine are depicted in map 400 as shown in FIG. 4. The engine may have a fuel system linked to an HVAC system by a common heat exchanger, as described above. The fuel system may be the fuel system 200 of FIG. 2 and the HVAC system may be any configuration of the HVAC system 110 of FIGS. 1A-1D. Map 400 shows time plotted along the x-axis and increasing to the right. Engine speed is depicted at plot 402, a fuel temperature in the engine is shown at plot 404, and a refrigerant temperature in the HVAC system is shown at plot 406, all increasing along the y-axis. An opening of a bypass valve is shown at plot 408, variable between a fully open and a closed position. The bypass valve may be positioned in a bypass of the HVAC system, delivering refrigerant to the bypass where the heat exchanger is disposed when the valve is at least partially open, e.g., not closed. A torque output of the engine is shown at plot 410, also increasing along the y-axis.

At t0, the engine is operating with a moderate speed (plot 402) and the fuel temperature (plot 404) may be relatively warm due to work performed on the fuel by a high pressure pump of the fuel system but below a first threshold 412. The first threshold 412 may be a temperature above which a density of the fuel may decrease to an extent that an injected amount of fuel does not meet a fuel quantity that produces a desired torque output. In at least one example, the first threshold 412 may correspond to the first threshold at 304 of FIG. 3. The refrigerant (plot 406) may be circulating through the HVAC system but not cycled through compression and expansion, thus the refrigerant temperature (plot 406) may be above a second threshold 414. The second threshold 414 may be a temperature that is sufficiently lower than the fuel temperature to reduce the fuel temperature to below the first threshold 412 if the fuel temperature rises above the first threshold 412. The bypass valve is closed and torque output (plot 410) is moderate, meeting a torque demand 416, as indicated by an overlaid dashed line.

At t1, engine speed increases and torque output rises in response to increasing torque demand 416. The refrigerant temperature remains unchanged and the bypass valve is maintained closed. Between t1 and t2, the fuel temperature rises. The fuel temperature may rise at least partially as a result of ambient temperature rising. For example, both the engine speed and the fuel temperature may increase due to the vehicle navigating an uphill slope under direct sunlight in a hot climate. The increase in fuel temperature leads to the fuel temperature reaching the first threshold at t2. The elevated fuel temperature reduces the fuel density, causing a shortfall in fuel injected at combustion chambers of the engine relative to fuel demand. The fuel shortfall may be a difference between fuel demand and an actual, injected amount of fuel that reaches or exceeds a threshold difference and results in a deviation between torque output and torque demand 416. The torque output plateaus between t2 and t3, falling short of the rising torque demand 416.

Responsive to the fuel temperature reaching the first threshold 412, compression of the refrigerant may be initiated. The HVAC system may cycle the refrigerant between a high pressure, high temperature status and a low pressure, low temperature status. Low pressure, low temperature refrigerant flows through the heat exchanger. The bypass valve is maintained closed while the refrigerant temperature is still above the second threshold 414 between t2 and t3 to allow the refrigerant temperature to continue decreasing without imposing heat transfer at the heat exchanger before the refrigerant is sufficiently cooled. Engine speed remains high.

At t3, the refrigerant temperature decreases to the second threshold 414, triggering opening of the bypass valve. The refrigerant is sufficiently cooled to absorb enough heat from fuel flowing through the heat exchanger to reduce fuel temperature to a desired temperature. Refrigerant flows through the heat exchanger and absorbs heat from the fuel, resulting in a decrease in fuel temperature. As the fuel temperature decreases, torque output rises, decreasing a difference between torque output and torque demand 416. The fuel temperature decreases to the first threshold 412 at t4 and the refrigerant temperature remains below the second threshold 414 due to continued cycling of the refrigerant through the HVAC system. Torque output meets torque demand 416 at t4.

At t5, the vehicle may no longer travel uphill and instead navigate level or downhill terrain. Engine speed decreases, and less torque output is demanded. Responsive to the lower engine speed and reduced torque demand 416, fuel cooling is no longer demanded and the bypass valve is closed. The fuel temperature remains below the first threshold 412. The cycling of refrigerant may be terminated but the refrigerant temperature remains below the second threshold 414 due to lack of heat transfer across the heat exchanger.

In this way, a fuel temperature of a vehicle engine may be reduced even when ambient air temperature is not low enough to sufficiently cool the fuel to a temperature that maintains a density of the fuel at a target density. A fuel system of the vehicle may share a heat exchanger with an HVAC system of the vehicle. The fuel and a cooling fluid, e.g., a refrigerant, of the HVAC system may flow through separate channels of the heat exchanger, the channels arranged in contact with one another so that heat may be transferred from the fuel to the cooling fluid. The cooling fluid may be chilled to below ambient temperature upon cycling through the HVAC system thereby enabling the cooling fluid to absorb enough heat from the fuel to reduce the fuel temperature to below ambient temperature. By cooling the fuel and mitigating a loss of fuel density, an injected quantity of fuel at fuel injectors of the engine may be maintained below a maximum deliverable amount. A likelihood of leakage at a high-pressure fuel pump of the fuel system is reduced, thus allowing a desired fuel rail pressure to be maintained. Degradation of engine performance is thus circumvented even at high engine speeds and loads and high ambient temperature.

The technical effect of cooling fuel via heat exchange with the refrigerant is that the torque generated at the engine is maintained at a desirable output.

In one embodiment, a method includes flowing a fuel from a high pressure pump to a fuel injector, injecting the fuel at a cylinder, and cooling the fuel to a temperature that is below ambient temperature via a compressed cooling fluid at a region of a fuel system of the vehicle. In a first example of the method, cooling the fuel includes transferring heat from the fuel to a heating, ventilation and air conditioning (HVAC) system flowing a refrigerant, and wherein the refrigerant is the cooling fluid. A second example of the method optionally includes the first example, and further includes, transferring heat from the fuel to the HVAC system includes arranging a heat exchanger in both a path of fuel flow and a path of refrigerant flow and wherein the heat exchanger is positioned in a bypass of the HVAC system. A third example of the method optionally includes one or more of the first and second examples, and further includes, wherein transferring the heat from the fuel to the HVAC system includes flowing fuel through a first channel of the heat exchanger and flowing refrigerant through a second channel of the heat exchanger and wherein the first channel is separate from the second channel and in contact with the second channel. A fourth example of the method optionally includes one or more of the first through third examples, and further includes, wherein transferring heat from the fuel to the HVAC system includes, responsive to a temperature of the fuel rising above a threshold temperature, at least one of actuating a compressor of the HVAC system to compress the refrigerant and opening a bypass valve to divert refrigerant flow through the bypass of the HVAC system. A fifth example of the method optionally includes one or more of the first through fourth examples, and further includes comprising cooling air in a passenger compartment of the vehicle via the refrigerant concurrent with transferring heat from the fuel when a total cooling demand imposed on a compressor of the HVAC system is below a threshold amount of cooling. A fifth example of the method optionally includes one or more of the first through fourth examples, and further includes closing a bypass valve of the bypass to block refrigerant flow to the heat exchanger when the total cooling demand on the compressor surpasses the threshold amount of cooling to prioritize cooling air in the passenger compartment over cooling the fuel.

In another embodiment, a cooling system includes a fuel system flowing fuel from a fuel tank to a fuel injector via a low pressure pump and a high pressure pump, a heating, ventilation, and air conditioning (HVAC) system flowing a refrigerant through a compressor, a condenser, a first expansion valve, and an evaporator, the HVAC system configured to cool a passenger compartment of the vehicle, and a heat exchanger coupled to both the fuel system and the HVAC system and configured to transfer heat from the fuel to the refrigerant. In a first example of the cooling system, the heat exchanger is arranged in a bypass of the HVAC system, the bypass including a bypass valve positioned upstream of the heat exchanger and between the low pressure pump and the high pressure pump of the fuel system. A second example of the cooling system optionally includes the first examples, and further includes, wherein the bypass valve is continuously adjustable between a fully open position and a closed position and configured to flow refrigerant to the heat exchanger when open and block refrigerant flow to the heat exchanger when closed. A third example of the cooling system optionally includes one or more of the first and second examples, and further includes, wherein the bypass is coupled to the evaporator of the HVAC system. A fourth example of the cooling system optionally includes one or more of the first through third examples, and further includes, wherein the bypass is a path parallel to at least a portion of the HVAC system that diverts refrigerant around the evaporator and the first expansion valve of the HVAC system and wherein the bypass includes a second expansion valve, arranged upstream of the heat exchanger. A fifth example of the cooling system optionally includes one or more of the first through fourth examples, and further includes, wherein an intermediate heat exchanger is arranged in a bypass of the HVAC system, the bypass including a bypass valve positioned upstream of the heat exchanger, the intermediate heat exchanger coupled to the HVAC system and to a secondary circuit flowing an intermediary cooling fluid and wherein heat is exchanged between the intermediary cooling fluid and the refrigerant at the intermediate heat exchanger. A sixth example of the cooling system optionally includes one or more of the first through fifth examples, and further includes, wherein the heat exchanger is coupled to the secondary circuit and to the fuel system and heat is exchanged between the fuel and the intermediary cooling fluid at the heat exchanger. A seventh example of the cooling system optionally includes one or more of the first through sixth examples, and further includes, wherein the compressor is activated to enable heat transfer at the heat exchanger when cooling of the passenger cabin by the HVAC system is not demanded.

In yet another embodiment, a method includes responsive to a fuel temperature rising above a threshold temperature, promoting heat exchange between a fuel flowing through a first passage of a heat exchanger and a cooling fluid flowing through a second passage of the heat exchanger, responsive to a request for vehicle cabin cooling when a total cooling demand of the vehicle is below a threshold amount of cooling and the fuel temperature is above the threshold temperature, providing cooling to both the vehicle cabin and the fuel via the cooling fluid, and responsive to the request for vehicle cabin cooling when the total cooling demand of the vehicle is at least equal to the threshold amount of cooling, delivering a full cooling capacity of the cooling fluid to the vehicle cabin. In a first example of the method, promoting heat exchange between the fuel and the cooling fluid includes transferring heat from the fuel to the cooling fluid through walls of the first passage and the second passage and wherein the cooling fluid is a refrigerant flowing through an air conditioning system of the vehicle. A second example of the method optionally includes the first example, and further includes, wherein promoting heat exchange between the fuel and the cooling fluid includes transferring heat from the fuel to the cooling fluid and from the cooling fluid to a refrigerant of an air conditioning system of the vehicle and wherein the cooling fluid is an intermediary coolant. A third example of the method optionally includes one or more of the first and second examples, and further includes, wherein promoting heat exchange between the fuel and the cooling fluid includes reducing a temperature of the fuel to below ambient temperature by compressing and expanding the cooling fluid to reduce a temperature of the cooling fluid to below ambient temperature. A fourth example of the method optionally includes one or more of the first through third examples, and further includes, wherein delivering the full cooling capacity of the cooling fluid to the vehicle cabin includes closing a bypass valve to block cooling fluid flow through the heat exchanger when the fuel temperature is above the threshold temperature.

In another representation, a method includes transferring heat from a fuel flowing through a fuel system to a refrigerant flowing through an air conditioning system via a heat exchanger fluidly coupled to both the fuel system and the air conditioning system, wherein transferring heat from the fuel to the refrigerant reduces a temperature of the fuel to below ambient temperature. In a first example of the method, transferring heat from the fuel to the refrigerant includes flowing fuel through the heat exchanger upon cooling the refrigerant to below ambient temperature via cycling the refrigerant through the air conditioning system. A second example of the method optionally includes the first example and further includes, flowing fuel through the heat exchanger when a temperature of the fuel rises above a threshold. A third example of the method optionally includes one or more of the first and second examples, and further includes, wherein transferring heat from the fuel to the refrigerant includes transferring heat from the fuel to an intermediary coolant and then transferring heat from the intermediary coolant to the refrigerant. A fourth example of the method optionally includes one or more of the first through third examples, and further includes, wherein flowing fuel through the heat exchanger and cycling the refrigerant through the air conditioning system is activated based on a detected shortfall in a torque output of the engine compared to a torque demand.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
    flowing a fuel from a high pressure pump to a fuel injector;
    injecting the fuel at a cylinder; and
    cooling the fuel to a temperature that is below ambient temperature via a compressed refrigerant at an unpressurized region of a fuel system of the vehicle by transferring heat from the fuel to a heating, ventilation and air conditioning (HVAC) system flowing the refrigerant including arranging a heat exchanger in both a path of fuel flow and a path of refrigerant flow via positioning the heat exchanger in a bypass of the HVAC system.

2. The method of claim 1, wherein transferring the heat from the fuel to the HVAC system includes flowing the fuel through a first channel of the heat exchanger and flowing the refrigerant through a second channel of the heat exchanger and wherein the first channel is separate from the second channel and in contact with the second channel.

3. The method of claim 1, wherein transferring heat from the fuel to the HVAC system includes, responsive to a temperature of the fuel rising above a threshold temperature, at least one of actuating a compressor of the HVAC system to compress the refrigerant and opening a bypass valve to divert refrigerant flow through the bypass of the HVAC system.

4. The method of claim 1, further comprising cooling air in a passenger compartment of the vehicle via the refrigerant concurrent with transferring heat from the fuel when a total cooling demand imposed on a compressor of the HVAC system is below a threshold amount of cooling.

5. The method of claim 4, further comprising closing a bypass valve of the bypass to block refrigerant flow to the heat exchanger when the total cooling demand imposed on the compressor surpasses the threshold amount of cooling to prioritize cooling air in the passenger compartment over cooling the fuel.

6. A cooling system for a vehicle, comprising:
    a fuel system flowing fuel from a fuel tank to a fuel injector via a low pressure pump and a high pressure pump;
    a heating, ventilation, and air conditioning (HVAC) system flowing a refrigerant through a compressor, a condenser, a first expansion valve, and an evaporator, the HVAC system configured to cool a passenger compartment of the vehicle; and
    a heat exchanger coupled to both the fuel system and the HVAC system and configured to transfer heat from the fuel to the refrigerant, wherein the heat exchanger is arranged in a bypass of the HVAC system, the bypass including a bypass valve positioned upstream of the heat exchanger and between the low pressure pump and the high pressure pump of the fuel system.

7. The cooling system of claim 6, wherein the bypass valve is continuously adjustable between a fully open position and a closed position and configured to flow refrigerant to the heat exchanger when open and block refrigerant flow to the heat exchanger when closed.

8. The cooling system of claim 6, wherein the bypass is coupled to the evaporator of the HVAC system.

9. The cooling system of claim 6, wherein the bypass is a path parallel to at least a portion of the HVAC system that diverts refrigerant around the evaporator and the first expansion valve of the HVAC system and wherein the bypass includes a second expansion valve, arranged upstream of the heat exchanger.

10. The cooling system of claim 6, further comprising a controller with instructions therein for adjusting a position of the bypass responsive to fuel temperature and ambient temperature.

11. The cooling system of claim 6, wherein the compressor is activated to enable heat transfer at the heat exchanger when cooling of the passenger cabin by the HVAC system is not demanded.

12. A method for a vehicle, comprising:
    responsive to a fuel temperature rising above a threshold temperature, promoting heat exchange between a fuel flowing through a first passage of a heat exchanger and a cooling fluid flowing through a second passage of the heat exchanger;
    responsive to a request for vehicle cabin cooling when a total cooling demand of the vehicle is below a threshold amount of cooling and the fuel temperature is above the threshold temperature, providing cooling to both a vehicle cabin and the fuel via the cooling fluid; and
    responsive to the request for vehicle cabin cooling when the total cooling demand of the vehicle is at least equal to the threshold amount of cooling, delivering a full cooling capacity of the cooling fluid to the vehicle cabin.

13. The method of claim 12, wherein promoting heat exchange between the fuel and the cooling fluid includes transferring heat from the fuel to the cooling fluid through walls of the first passage and the second passage and wherein the cooling fluid is a refrigerant flowing through an air conditioning system of the vehicle.

14. The method of claim 12, wherein promoting heat exchange between the fuel and the cooling fluid includes transferring heat from the fuel to the cooling fluid and from the cooling fluid to a refrigerant of an air conditioning system of the vehicle and wherein the cooling fluid is an intermediary coolant.

15. The method of claim 12, wherein promoting heat exchange between the fuel and the cooling fluid includes reducing a temperature of the fuel to below ambient temperature by compressing and expanding the cooling fluid to reduce a temperature of the cooling fluid to below ambient temperature.

16. The method of claim 12, wherein delivering the full cooling capacity of the cooling fluid to the vehicle cabin includes closing a bypass valve to block cooling fluid flow through the heat exchanger when the fuel temperature is above the threshold temperature.

* * * * *